Sept. 3, 1968   TATSUO KAWASAKI ET AL   3,400,354
HALL-EFFECT DEVICE
Filed Dec. 23, 1966
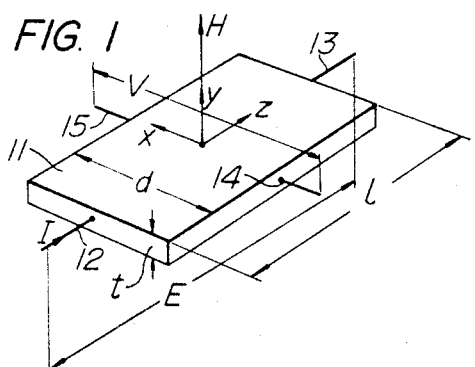
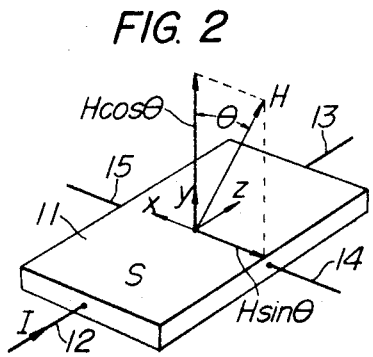
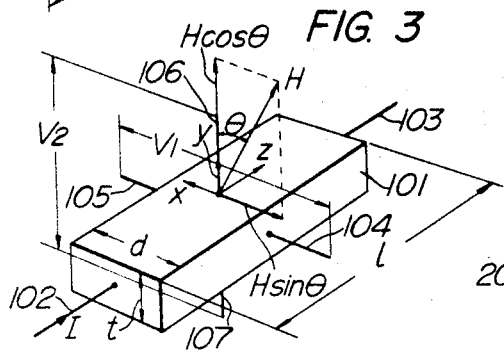
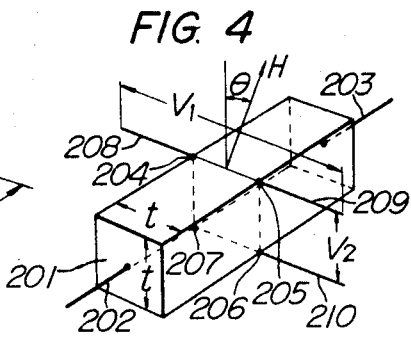
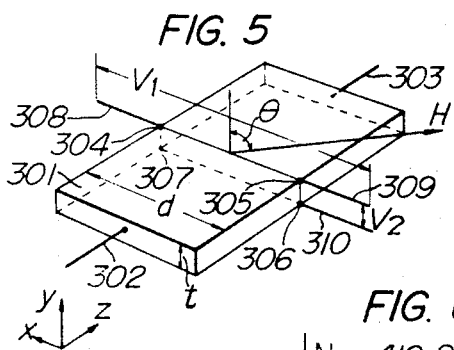
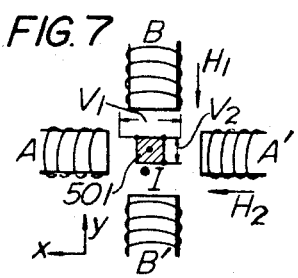
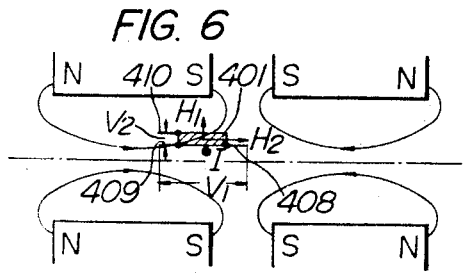

United States Patent Office 3,400,354
Patented Sept. 3, 1968

3,400,354
HALL-EFFECT DEVICE
Tatsuo Kawasaki and Hiromasa Hasegawa, Takatsuki-shi, Japan, assignors to Matsushita Electronics Corporation, Osaka, Japan, a corporation of Japan
Filed Dec. 23, 1966, Ser. No. 604,278
Claims priority, application Japan, Dec. 28, 1965, 41/308
1 Claim. (Cl. 338—32)

ABSTRACT OF THE DISCLOSURE

A Hall-effect device having a rectangular prism of a material with high carrier mobility, a pair of input current electrodes mounted on opposite sides of the prism and two pairs of output electrodes. The two pairs of electrodes are mounted on the sides of the prism perpendicular to the sides having the input electrodes with the electrodes of each pair being mounted on opposite sides of the prism and the pairs of electrodes being perpendicular to each other.

This invention relates to a unique Hall-effect device whereby distribution of magnetic field strength in a magnetic field can be measured utilizing the Hall-effect.

This invention is a novel device whereby field strength of two components of a magnetic field can be measured using a single Hall-effect device, without moving the said element relatively to the magnetic field.

For a fuller understanding of the nature and objects of the invention, reference should be made to the following detailed description taken in connection with the accompanying drawings wherein:

FIG. 1 and FIG. 2 are illustrative drawings to explain the principle of the conventional Hall-effect device.

FIG. 3 is an illustrative drawing of the Hall-effect device of this invention.

FIG. 4 and FIG. 5 are the Hall-effect devices embodying this invention.

And FIG. 6 and FIG. 7 are drawings illustrating measurement of the magnetic field with the Hall-effect device of this invention.

The conventional Hall-effect device based on the Hall-effect comprises, as roughly shown in FIG. 1 and FIG. 2, a rectangular thin plate made of a material with high carrier mobility such as germanium or silicon, the input electrodes 12 and 13 being attached to one pair of opposite sides of the Hall element 11 and the output electrodes 14 and 15 being attached to another pair of opposite sides. If the magnetic field H is given along the $y$ axis and the electric current I is flowing across the Hall element 11 with the source voltage E supplied to the input electrodes 12 and 13 attached along the $z$ axis, it is well known that the Hall electromotive force V as shown hereunder appears between the output electrodes 14 and 15 attached along the $x$ axis, $$V = R \frac{HI}{t} f(l/d) \qquad (1)$$

where, R is the Hall coefficient of the material of the Hall element, $t$ is the dimension of the plate along the direction of the magnetic field, $l$ is the dimension of the plate along the direction of the said electric current, $d$ is the dimension of the same along the direction of the Hall voltage, and $f(l/d)$ is a coefficient determined by the shape ($l$ and $d$) of the said plate. As obvious from the formula, the output voltage from the element is inversely proportional to the thickness $t$ of the plate.

If the direction of the magnetic field has an inclination against the $y$ axis by the angle $\theta$ as shown in FIG. 2, the component of the magnetic field along the $y$ axis will be $H \cos \theta$, and the electro-motive force generated between the output electrodes 14 and 15 will be:

$$V = R \frac{HI \cos \theta}{t} f(l/d) \qquad (2)$$

With the conventional Hall element as shown in FIG. 1, it has been impossible to measure the component of the magnetic field along the $x$ axis (: $H \sin \theta$) or the directional angle $\theta$ of the magnetic field, without changing the relative position of the said element against the said magnetic field. However, with the Hall-effect device of this invention, it is possible, even when the direction of the magnetic field is not in alignment with the direction of the $y$ axis, to measure two components of the magnetic field in a plane perpendicular to the direction of the current ($H \cos \theta$ and $H \sin \theta$) and the directional angle $\theta$ of the magnetic field, without changing the relative position of the element against the magnetic field.

FIG. 3 is an oblique view illustrating the principle of the Hall-effect device of this invention. As shown in the figure, the Hall element 101 in the shape of a regular prism (made of the same material as the conventional one) has the input electrodes 102 and 103 attached to one pair of opposite sides (in the direction of the $z$ axis), the first output electrodes 104 and 105 attached to another pair of opposite sides (in the direction of the $x$ axis), and the second output electrodes 106 and 107 attached to the still another pair of opposite sides (in the direction of the $y$ axis). If, while the current I is flowing between the input electrodes 102 and 103, the magnetic field of strength H is applied to the element, in a direction inclined toward the direction of the $x$ axis by the angle $\theta$ from the direction of the $y$ axis, in a plane ($xy$ plane) perpendicular to the direction of the $z$ axis, the electro-motive force $V_1$ and $V_2$ as expressed hereunder will appear between the first output electrodes 104 and 105, and between the second output electrodes 106 and 107, respectively:

$$V_1 = R \frac{HI \cos \theta}{t} f(l/d) \qquad (3)$$

$$V_2 = R \frac{HI \sin \theta}{d} f(l/t) \qquad (4)$$

where, $d$ is the dimension of the element along the $x$ axis and $t$ is the dimension of the same along the $y$ axis. As seen from the Formulas 3 and 4, the $y$ component of the magnetic field H: that is $H \cos \theta$, is determined from the electro-motive force between the first output electrodes 104 and 105, and the $x$ component of the magnetic field H: that is $H \sin \theta$, is determined from the electro-motive force between the second output electrodes 106 and 107. Thus, with both components $H \cos \theta$ and $H \sin \theta$ determined, the strength H of the magnetic field and the direction $\theta$ thereof can be determined easily.

FIG. 4 shows an embodiment of the Hall-effect device of this invention, in which the input electrodes 202 and 203 are attached to a pair of opposite sides of the Hall element 201 and the cross section perpendicular to the direction of the input current, as indicated by 204, 205, 206 and 207, has a shape of square. The two pairs of output electrodes are constituted with the electrodes 208, 209 and 209, 210 attached at the positions 204, 205 and 206 on the square section. The electro-motive forces $V_1$ and $V_2$ produced between the output electrodes 208, 209 and 209, 210, respectively, correspond to those given by the Formulas 3 and 4 respectively, when $t$ is equal to $d$. Accordingly, when the said two components of the magnetic field are same in the strength, the two electro-motive force will be also same. This type of Hall-effect device is suitable for the measurement of magnetic field where there is not much difference between the values of said two components.

FIG. 5 shows another embodiment of the Hall-effect device of this invention, in which the cross-section of element 301 perpendicular to the direction of the input current, as indicated by 304, 305, 306 and 307 has an oblong shape. In this embodiment, the input electrode 302 and 303 are attached to a pair of opposite sides, and two pairs of the output electrodes are constituted with the electrodes 308, 309 and 309, 310 attached at the positions 304, 305 and 306 on the oblong section. In this embodiment, the dimension 5 along the $y$ axis is far less than the dimension $d$ along the $x$ axis. Where the said two components of the magnetic field are same in the strength, the electro-motive force $V_1$ produced from the first output electrodes 308 and 309 is far greater than the electro-motive force $V_2$ from the second electrodes 309 and 310, because the output electro-motive force from the element is inversely proportional to the thickness thereof, as obvious from the Formulas 3 and 4. In other words, sensitivity of the device to the magnetic field in the $y$ direction is far higher than that in the $x$ direction. This type of Hall-effect device is suitable to measure the feeble component of the magnetic field along the $y$ axis with high sensitivity, simultaneously measuring the $x$ component of the field, where the direction of the magnetic field is near to the direction of the $x$ axis ($\theta \simeq 90°$).

A few examples of the Hall-effect device embodied in accordance with this invention will be given hereunder.

(a) Simultaneous measurement of the axial and radial components of magnetic field in an axially symmetrical magnet (especially, the one in the permanent periodic magnet of a travelling-wave tube):

In the measurement of magnetic field in an axially symmetrical magnet such as the one by the permanent periodic magnet used in a travelling-wave tube, if a Hall-effect device in accordance with this invention is placed in the magnetic field, as shown in FIG. 6, the radial component $H_1$ of the magnetic field can be measured at the output electrodes 408 and 409 of the Hall element 401, and the axial component $H_2$ at the output electrodes 409 and 410, without changing the position of the device. The distribution of the magnetic field (spacial distribution of $H_1$ and $H_2$) can be measured by shifting the device in parallel successively in the field. The radial component $H_1$ and the axial component $H_2$ of the said magnetic field are generally much different in the strength, and $H_1$ is very small especially on the axis of the tube. Therefore, it is convenient, for the measurement of such magnetic field, to use a thin and wide Hall element as the embodiment shown in FIG. 5. Thus, use of the Hall-effect device of this invention makes possible accurate, quick and easy measurement of the distribution of an axially symmetrical magnetic field.

(b) Measurement of the rotating magnetic field: FIG. 7 shows a rotating magnetic field composed by two alternating magnetic fields AA' and BB', positioned perpendicularly to each other, where the $y$ component $H_1$ and the $x$ component $H_2$ of the magnetic field are altering with the time $t$ at the rate of angular frequency $\omega$.

$$H_1 = H_{10} e^{j\omega t} \quad (5)$$
$$H_2 = H_{20} e^{j(\omega t + \phi)} \quad (6)$$

where $H_{10}$ and $H_{20}$ are the magnitudes of the fields $H_1$ and $H_2$, respectively, and $\phi$ is the phase difference between the said two alternating magnetic fields. The instantaneous value of the $x$ component and the $y$ component of such magnetic field can be determined simultaneously for any given instant, by the use of the Hall-effect device 501 of this invention. In order to measure such magnetic field as stated above where the components $H_1$ and $H_2$ are generally of same order in the magnitude, it is convenient to use such Hall-effect device like the embodiment shown in FIG. 4.

Besides the examples described above, the Hall-effect device of this invention is very useful to measure, without changing the relative position of the element against the field, the two components of a magnetic field such as plasma focusing magnetic field or a magnetic field in a limited space, where the direction of the field varies with location or the time.

Since certain changes may be made in the above apparatus without departing from the scope of the invention involved, it is intended that all matter contained in the above description or shown in the accompanying drawings shall be interpreted as illustrative and not in a limiting sense.

What is claimed is:

1. A Hall-effect device for measuring the distribution of magnetic field strength in a magnetic field comprising a Hall element having the shape of a substantially regular prism, an input current electrode mounted on each of a pair of opposite sides of said prism, and two pairs of electrodes mounted perpendicular to each other and on opposite sides of said prism which are on two sides perpendicular to said opposite sides and to each other, said two pairs of electrodes not bordering either of said opposite sides, said two pairs of electrodes being output electrodes.

References Cited

UNITED STATES PATENTS

| | | | |
|---|---|---|---|
| 3,172,032 | 3/1965 | Hunt | 338—32 X |
| 3,202,913 | 8/1965 | Marinace. | |
| 3,304,530 | 2/1967 | Honig | 324—45 X |

CARL D. QUARFORTH, *Primary Examiner.*

R. L. GRUDZIECKI, *Assistant Examiner.*